United States Patent [19]
Kluge

[11] Patent Number: 5,924,098
[45] Date of Patent: Jul. 13, 1999

[54] METHOD AND APPARATUS FOR MANAGING A LINKED-LIST DATA STRUCTURE

[75] Inventor: Kevin L Kluge, Cupertino, Calif.

[73] Assignee: Sun Microsystems, Inc., Mountain View, Calif.

[21] Appl. No.: 08/887,339

[22] Filed: Jun. 30, 1997

[51] Int. Cl.[6] ................................................ G06F 17/30
[52] U.S. Cl. .............................................. 707/100; 707/8
[58] Field of Search ............................ 707/8, 100, 206, 707/101, 102

[56] References Cited

U.S. PATENT DOCUMENTS

| | | | |
|---|---|---|---|
| 4,149,243 | 4/1979 | Wallis | 364/200 |
| 5,168,554 | 12/1992 | Luke | 395/161 |
| 5,287,521 | 2/1994 | Nitta et al. | 707/8 |
| 5,293,600 | 3/1994 | Vrizen | 395/425 |
| 5,295,262 | 3/1994 | Seigh, II | 707/8 |
| 5,319,778 | 6/1994 | Catino | 707/8 |
| 5,442,758 | 8/1995 | Slingwine et al. | 707/8 |
| 5,469,567 | 11/1995 | Okada | 707/8 |
| 5,495,609 | 2/1996 | Scott | 707/8 |

OTHER PUBLICATIONS

*Under the Hood*: Java's garbage–collection heap, Java World Editors Choice Java Database, Jan. 18, 1999, Bill Venners, pp. 1–5.

*Core JAVA*, The Sunsoft Press Java Series, A Prentice Hall Title, 1996, Gary Cornell and Cay S. Horstmann, Chapter 12 "Multithreading", pp. 501–549.

*The Java™ Language Specification*, The Java Series, Addison–Wesley, 1996, James Gosling, Bill Joy and Guy Steele, Chapter 17 "Threads and Locks", pp. 399–417.

Glenn Krasner, "The Smalltalk–80 Virtual Machine", Learning Research Group, Byte Publication Inc., Aug. 1981, pp. 300–320.

*Primary Examiner*—Thomas G. Black
*Assistant Examiner*—Frantz Coby
*Attorney, Agent, or Firm*—Blakely Sokoloff Taylor & Zafman

[57] ABSTRACT

A method of managing a linked-list data structure is disclosed. The linked-list data structure has a number of elements, each of which includes a data item and a pointer to a sequentially following element. The method allows the modification of the linked-list data structure, either by the insertion or removal of element therefrom, while permitting a concurrent and unsynchronized traversal operations with respect to the linked-list data structure. Specifically, the method requires that the pointers of elements within the linked-list data structure be modified using an atomic operation to reflect any modifications made to the linked-list data structure. The utilization of atomic operations to update the pointers ensures that the unsynchronized traversal operations examine a valid data path.

22 Claims, 7 Drawing Sheets

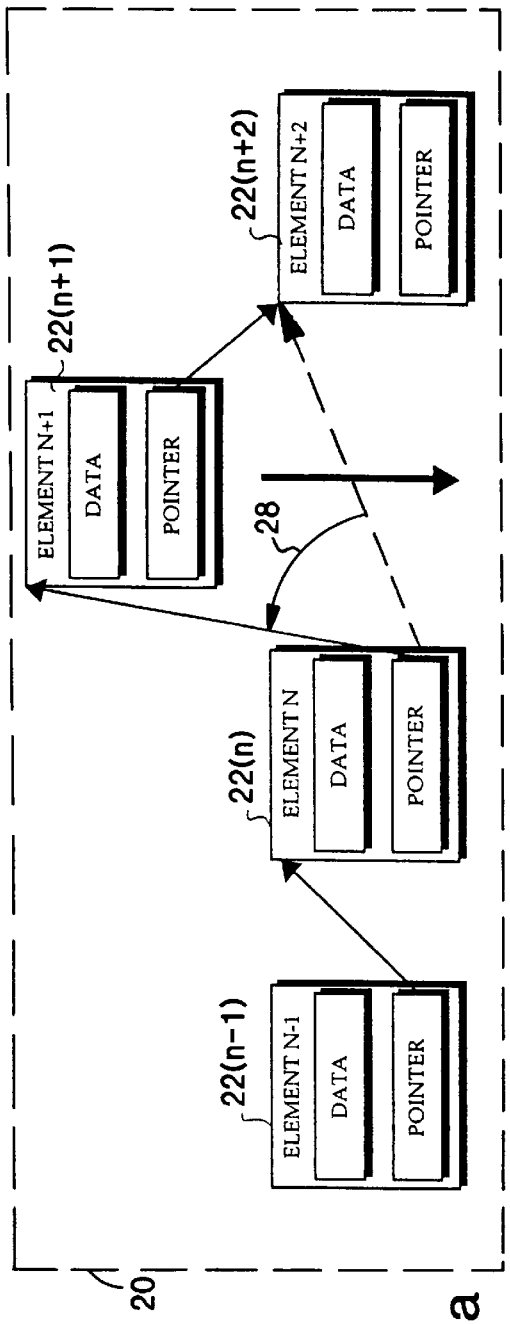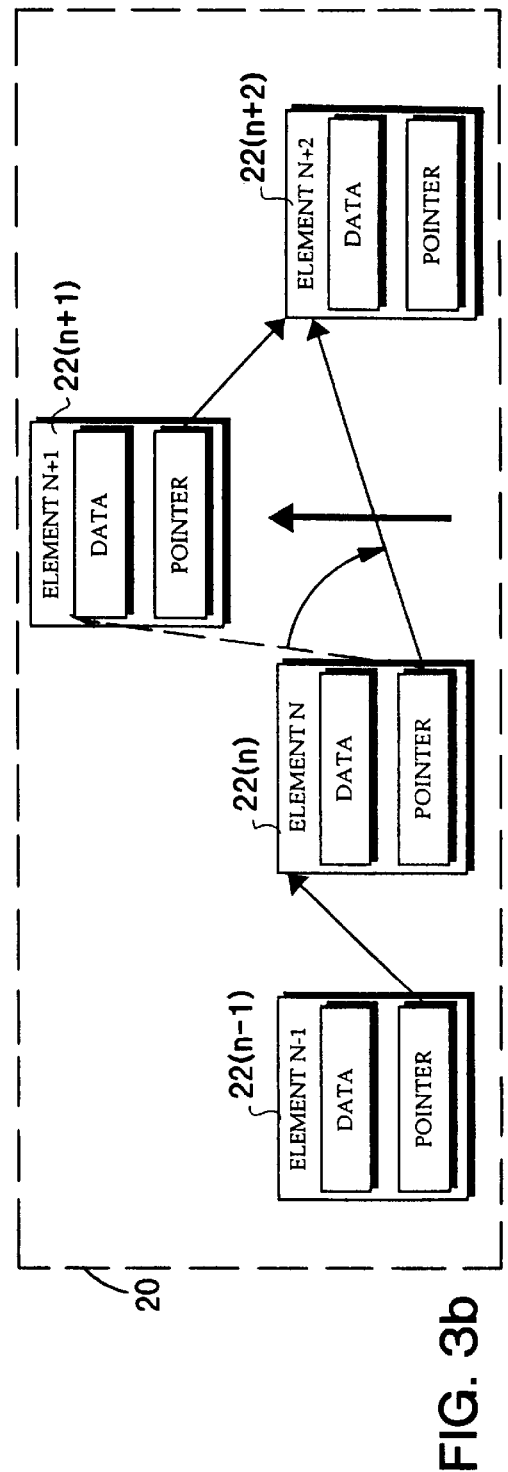

METHOD AND APPARATUS FOR MANAGING A LINKED-LIST DATA STRUCTURE

FIELD OF THE INVENTION

The present invention relates generally to the field of computer software programs and, more specifically, to a method of managing a linked-list data structure maintained and accessed by a computer program.

BACKGROUND

Linked-list data structures store sequences of data elements, and provide the ability to rapidly add and remove data elements from such sequences. Linked-list data structures are characterized in that each element thereof includes a pointer to the next sequential element in the linked-list. Accordingly, it will be appreciated that the addition of an element to, or the removal of an element from, the linked-list data structure requires that the pointer of the immediately preceding element be updated to reflect the modification to the linked-list data structure.

Multi-threaded programs include a number of threads, a number of which may require access to a particular linked-list data structure. Such threads may perform either non-modifying operations, such as GETs, or modifying operations, such as ADDs, with respect to the linked-list data structure. In order to prevent simultaneous accesses by a number of threads to an object, such as a link-listed data structure, it is common practice for such threads to implement so-called "synchronized" methods, which perform a lock action on the target object, thus preventing any other methods from gaining access to the target object until that object is again unlocked by the active method.

Where the target object is a linked-list data structure, this entire data structure is thus typically locked by a synchronized method until that method completes. Accordingly, concurrent accesses by different threads to a linked-list data structure are prohibited.

SUMMARY OF THE INVENTION

According to a first aspect of the invention, there is provided a method of managing a linked-list data structure. The linked-list data structure includes a first element having both a data portion and a pointer portion. The method requires the modification of the linked-list data structure by either the insertion or removal of a second element. The pointer portion of the first element is then updated to reflect the modification to the linked-list data structure. This updating of the pointer portion of the first element comprises an atomic operation. Concurrently with the modification of the linked-list data structure, an unsynchronized traversal of the linked-list data structure is performed. In one embodiment, the traversal operation is a non-modifying operation, and comprises a data read and/or retrieval operation.

According to a second aspect of the invention, there is provided a computer-readable medium having stored thereon a sequence of instructions which, when executed by a processor, cause the processor to perform the steps of the method as described above.

According to a third aspect of the invention, there is provided, in an object-oriented programming environment, a linked-list object. The object includes a linked-list data structure, and a modifying method which modifies the linked-list data structure by the insertion or removal of a first element. The object also includes an updating method which updates a pointer portion of a second element to reflect modifications made to the linked-list data structure by the modifying method. The updating steps performed by the updating method comprise an atomic operation. The object also includes a traversal method which performs an unsynchronized traversal of the linked-list data structure concurrently with the modification of the link-list data structure by the modifying method. The traversal may perform an inspection of the pointer portion of the first element as an atomic operation.

Other features on the present invention will be apparent from the accompanying drawings, the detailed description and the claims which follow.

BRIEF DESCRIPTION OF THE DRAWINGS

The present invention is illustrated by way of example and not limitation in the figures of the accompanying drawings, in which like references indicate some of the elements and in which:

FIGS. 3a and 3b are schematic illustrations showing respective element insertion and removal operations performed with respect to the linked-list data structure shown in FIG. 2.

DETAILED DESCRIPTION

A computer-implemented method of managing a linked-list data structure is described. In the following description, for the purposes of explanation, a number specific details are set forth in order to provide a thorough understanding of the present invention. It will be evident, however, to one skilled in the art that the present invention may be practiced without these specific details. Specifically, while one exemplary embodiment is described below as being implemented in an object-oriented programming language, the invention is not restricted to this or any other programming language type.

Figure 1:
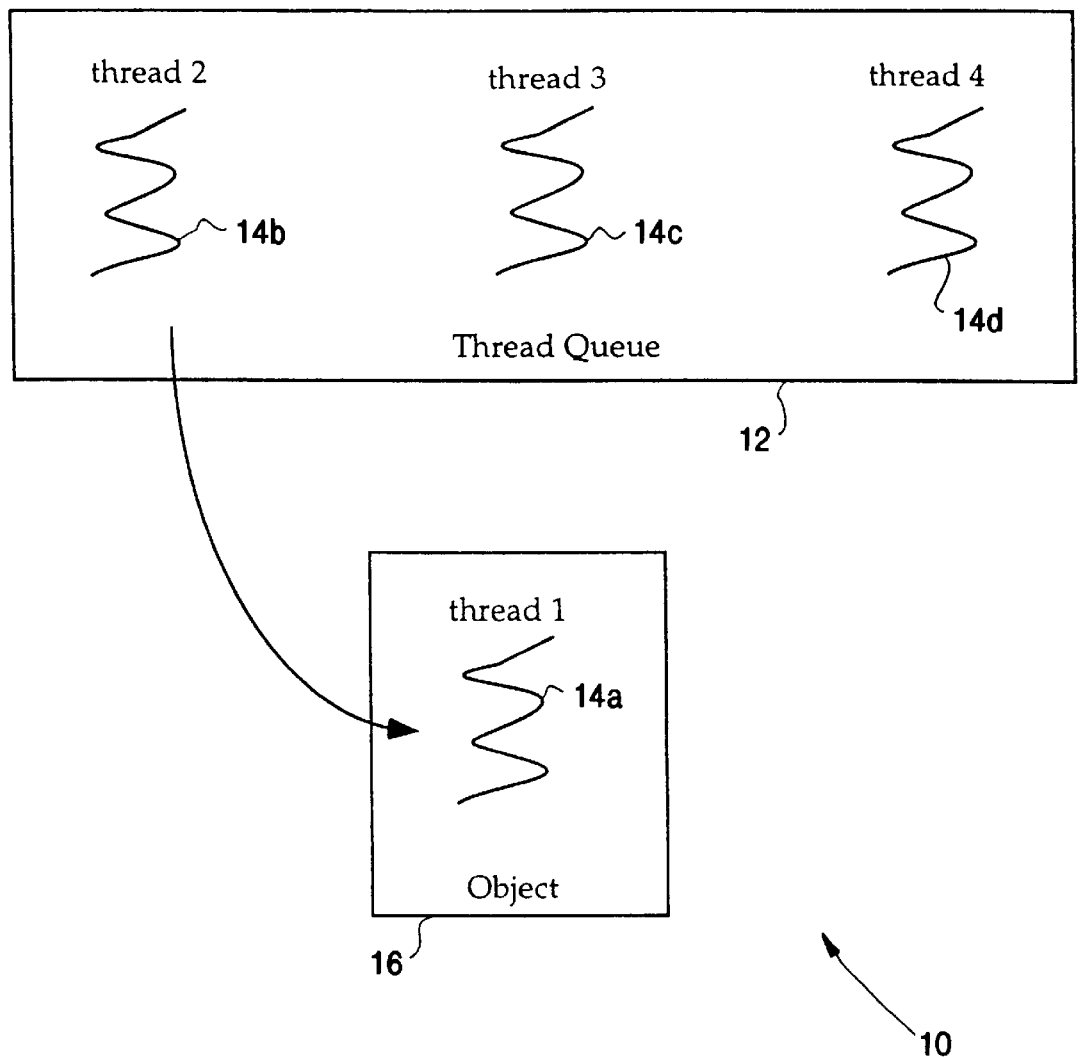
FIG. 1 is a block diagram showing a multi-threaded program operating in an object-oriented program environment.

Referring to FIG. 1, there is shown a block diagram of a multi-threaded program (10) created in an object-oriented program language, such as the Java™ programming language developed by Sun Microsystems of Mountain View, Calif. The program 10 is shown to maintain a thread queue 12 of threads 14b, 14c and 14d, which require access to an object 16. A thread 14a is shown currently to have access to the object 16. The multi-threaded program 10 is characterized in that each of the threads 14 share data, and thus may have access to common data and variables, which may be contained in an object such as the object 16. For example, in the Java™ programming language, a Java Virtual Machine (JVM) may support many threads of execution at any one time. Each of these threads independently executes Java code that operates on values and objects residing in a shared memory. Multiple-threads may be supported by having multiple hardware processes, by time-slicing a single hardware processor, or by time-slicing many hardware processors.

An active thread 14 may have access to any object to which it has a reference. For example, each of the threads 14a–d has a reference to object 16. Where two or more threads have access to a common object, it is conceivable that operations performed by each of these threads may collide and result in corruption of the relevant object or a malfunction of either or both of the threads. To address this problem, it is common practice to specify "synchronized" access to shared objects by multiple threads. Specifically, the term "synchronized" refers to the ability to ensure that one thread has completed an operation, with respect to an object, variable or data, without interruption. The use of semaphores or mutexes can be used to implement synchronization. Alternatively, synchronization between thread accesses can be obtained by the use of "monitors", which are high-level mechanisms for allowing only one thread at a time to execute a region of code protected by the relevant monitor. In the Java™ language, an object that is capable of blocking threads, and then again notifying the blocked threads when it becomes available, is termed a monitor object. For example, referring to FIG. 1, the object 16 may be a monitor object, in which case it will block threads 14b–c when thread 14a has access thereto, and will notify the thread queue 12 when the thread 14a has completed its access to the object 16. The action of blocking access by other threads to an object is referred to as performing a "lock", and the action of again allowing access to an object by another thread is referred to as an "unlocked" operation.

It will be appreciated that threads executing synchronized methods suffer a performance disadvantage in that only a single thread can access an object at any one time, thus certain concurrent operations may be prohibited.

Figure 2:
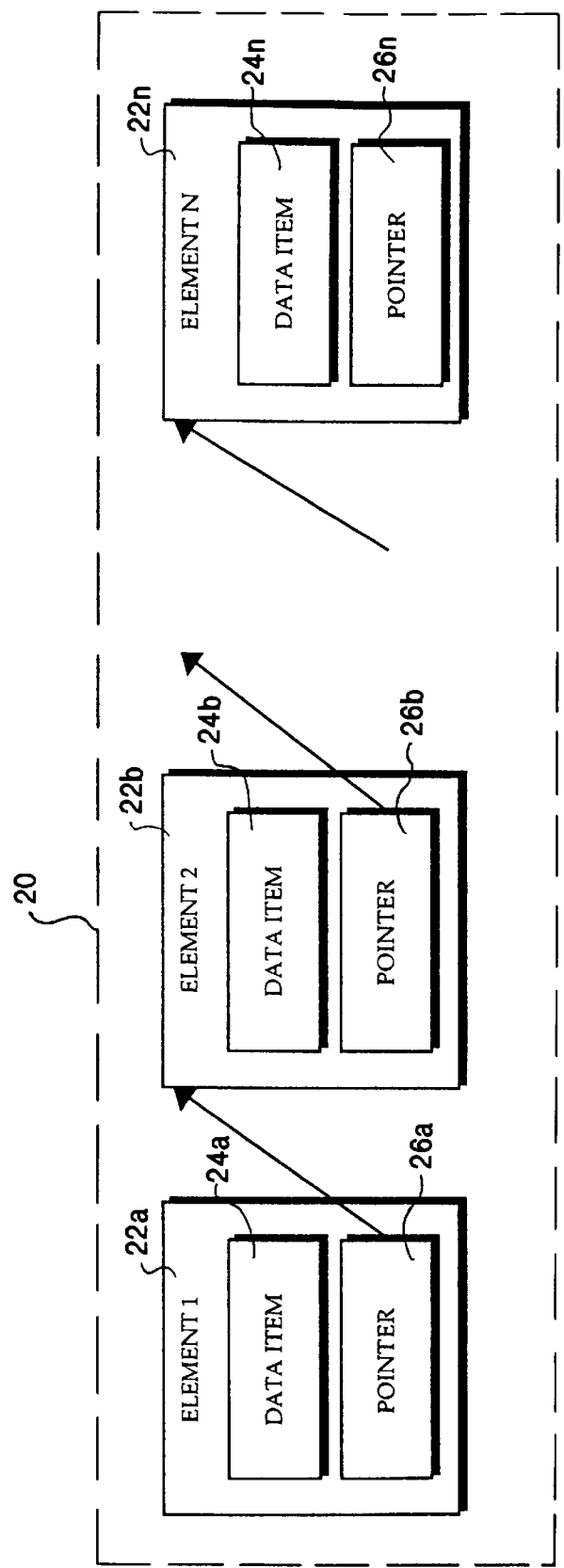
FIG. 2 is a schematic representation of a linked-list data structure.

A common data structure type which is incorporated within objects 16 is the linked-list data structure 20, as illustrated in FIG. 2. The linked-list data structure 20 comprises an ordered sequence of elements 22a–22n, and facilitates the rapid insertion and removal of elements from this sequence. Each element 22 comprises a data item 24 and a pointer 26 to the next sequential element 22 in the linked-list data structure 20. The last element 22n in the data structure 20 has a null pointer to denote the end of the list.

FIGS. 3a and 3b illustrate modifications of a link-list data structure 20. Specifically, FIG. 3a illustrates the insertion of an element 22 (n+1) into the data structure 20 between elements 22(n) and 22(n+2). FIG. 3b similarly shows the removal of an element 22(n+1) from a linked-list data structure 20. Referring firstly to FIG. 3a, an active thread having access to an object including the linked-list data structure 20 may wish to insert the element 22(n+1). The insertion (or addition) of such an element into the linked-list data structure 20 requires that the pointer of the element 22(n), which immediately precedes the location into which the element 22(n+1) is to be inserted, be updated to point from the previously-sequential element 22(n+2) to the newly inserted element 22(n+1). This updating of the pointer of element 22(n) is indicated by arrow 28. The pointer of the inserted element 22(n+1) must also be set to point to element 22(n+2).

In one embodiment of the present invention, each pointer 26 comprises a 32-bit address. The need for synchronization in a program becomes apparent when considering the hypothetical in which two threads are simultaneously accessing the linked-list data structure 20. Specifically, consider that a first thread, which is inserting the element 22(n+1), is updating the pointer 26 of the element 22(n) to point to the newly inserted element 22(n+1). Simultaneously, a second thread may be performing a traversal of the data structure 20 by examining the data path specified thereby. Specifically, the second thread may be traversing the data structure 20 with a view to retrieving a predetermined data item 24. As the second thread is dependent on the pointer of each element to direct it to the next element in the sequence, it will be appreciated that a read operation, performed on a partially modified pointer, would prove disastrous to the traversal of the data structure 20 by the second thread. In order to prevent a scenario such as that outlined above, it has been common practice to synchronize methods of objects which access linked-list data structures 20, so that only one thread or method has access to the data structure 20 at any one time. Specifically, synchronization may be utilized to obtain a lock on a data structure, such as hash table, which references a linked-listed data structure, or directly on the linked-list data structure 20 itself. It will, however, be appreciated that allowing only one method at a time to access the linked-list data structure does not provide optimum performance. To appreciated the significance of the present invention, three operations which may be performed with respect to a linked-list data structure 20 must be considered, namely:

1. An insertion (or addition) operation, wherein an element is added to the linked-list data structure 20 as illustrated in FIG. 3a;
2. A removal (or deletion) operation wherein an element is removed from the data structure 20 as illustrated in FIG. 3b; and
3. A traversal operation, in which the contents of elements within the data structure 20 are examined with a view to establishing the presence of a certain data item therein and/or possibly to retrieve such a data item.

A traversal operation is distinguished from the insertion and removal operations in that no modification to the data structure 20 occurs. The present invention proposes a method in which non-modifying traversals of the linked-list data structure 20 are unsynchronized with respect to other traversal operations and with respect to modify operations. The implementation of unsynchronized traversal operations is advantageous in that modify and traversal operations can occur concurrently, and in that a number of unsynchronized traversals of the linked-list data structure 20 can also occur concurrently. Thus, in programs in which multiple threads perform primarily traversal operations on a linked-list data structure 20, a large number of these threads are able concurrently to access the data structure 20. The implementation of unsynchronized traversal operations is facilitated by the specification of atomic read and write operations by threads of the pointers 26 of elements 22. Specifically, an atomic operation is considered to be functionally indivisible and is thus ensured to complete. The methodology of the present invention will now be described with specific reference to FIGS. 3a and b. The insertion method illustrated in FIG. 3a is synchronized (with respect to other synchronized methods), and comprises, inter alia, the following steps:

1. Checking whether the element to be inserted already exists within the linked-list structure 20. If so, the insertion operation may be aborted.
2. In an atomic operation, the pointer of the inserted element 22(n+1) is updated to point to the next sequential element 22(n+2). On completion of this step, both elements 22(n) and 22(n+1) point to the same element 22(n+2).

3. In an atomic operation, the pointer of element 22(n) is updated to point to the inserted element 22(n+1).

Similarly, the synchronized method of removing an element 22 from the linked-list data structure 20 may comprise, inter alia, the following steps:

1. Performing a check operation to establish whether the relevant data item is in fact contained in the linked-list; and
2. In an atomic operation, setting the pointer of element 22(n) to point to the element 22(n+2).

In the operations performed above, it should be noted that the modifications to the pointers 26 of the elements 22 comprise atomic operations. Accordingly, any method performing a traversal operation of the linked-list data structure 20 during either such insertion or deletion operations will be guaranteed to examine a valid data path. It is this guarantee of a valid data path which facilitates access to the linked-list data structure 20 by methods implementing unsynchronized traversal operations. However, in one embodiment, it will be appreciated that synchronized modifying operations are still required to prevent collisions between such modifying operations. The use of unsynchronized traversal methods thus allows a number of threads incorporating such unsynchronized traversal methods concurrently to access a single linked-list data structure 20, and in this way to optimize performance of a computer program.

The present invention is furthermore particularly suited for use in programming languages which have the capability to implement so-called "mark and sweep garbage collection". Specifically, such mark and sweep garbage collection techniques do not require that reference counter mechanisms be implemented to maintain a tracking of references to a specific object. Garbage collection schemes which employ reference counting require synchronized operations and may accordingly limit the performance advantage achieved by the present invention when performing a synchronized garbage collection operation.

Figure 4:
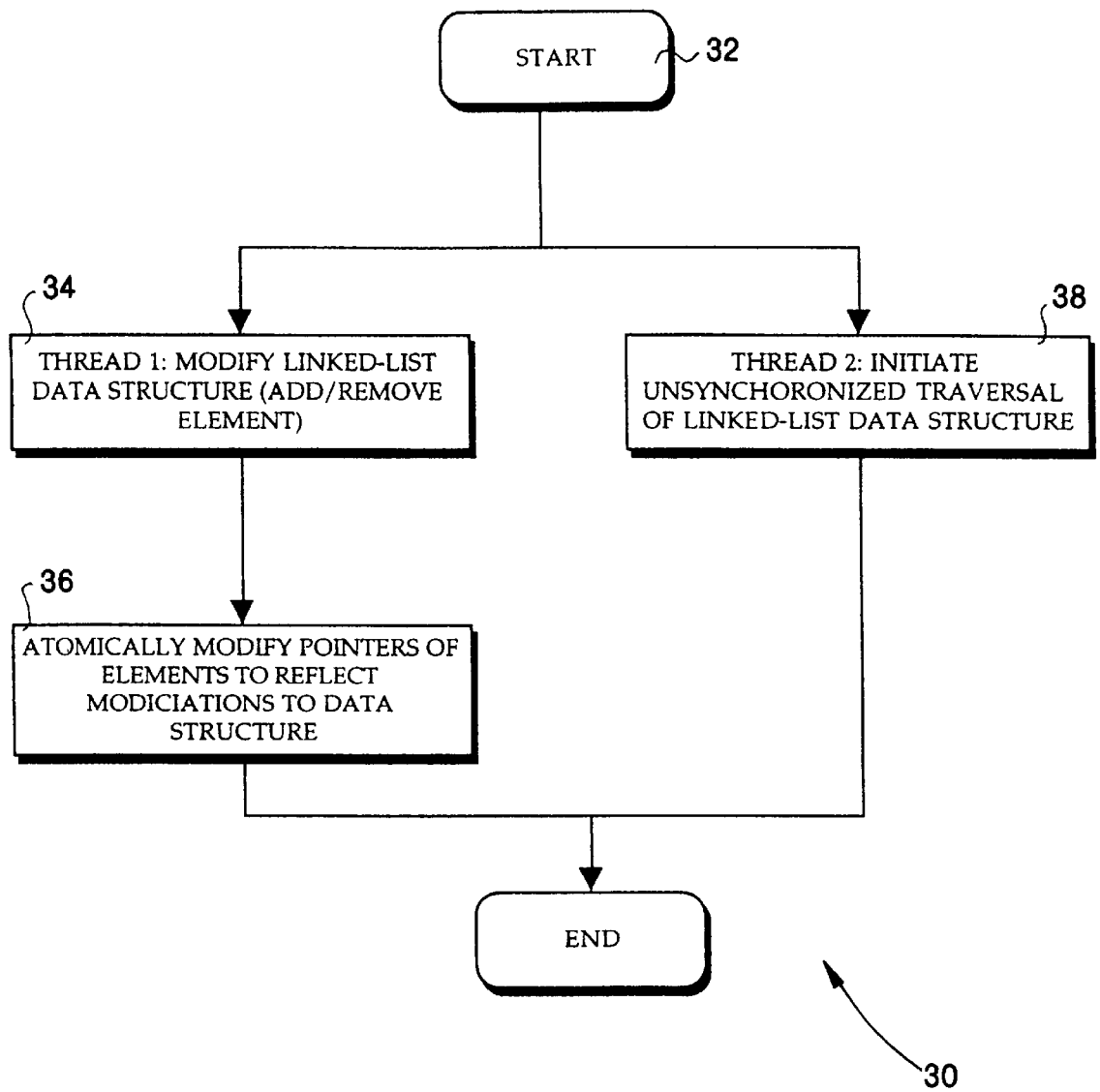
FIG. 4 is a flow chart illustrating a method, according to one embodiment of the present invention, of managing a linked-list data structure.

Referring now to FIG. 4, there is illustrated a method 30, according to the present invention, of managing a linked-list data structure 20 including a number of elements 22. The method commences at step 32 and then proceeds to perform in two sets of operations in parallel. Specifically, the method 30 allows a first thread, at step 34, to modify the linked-list data structure 20 by the insertion or removal of an element 22. The method 30 then proceeds to step 36, wherein pointers of pertinent elements 22 within the data structure 20 are atomically modified to reflect the modification made at step 34. In one embodiment of the invention, the programming language which facilitates the atomic modification and reading of the pointers 26 is the Java™ programming language. Concurrently with the performance of steps 34 and 36, the method 30 of the present invention allows the concurrent performance of any number of unsynchronized traversal operations of the linked-list data structure 20, at step 38.

Figure 5:
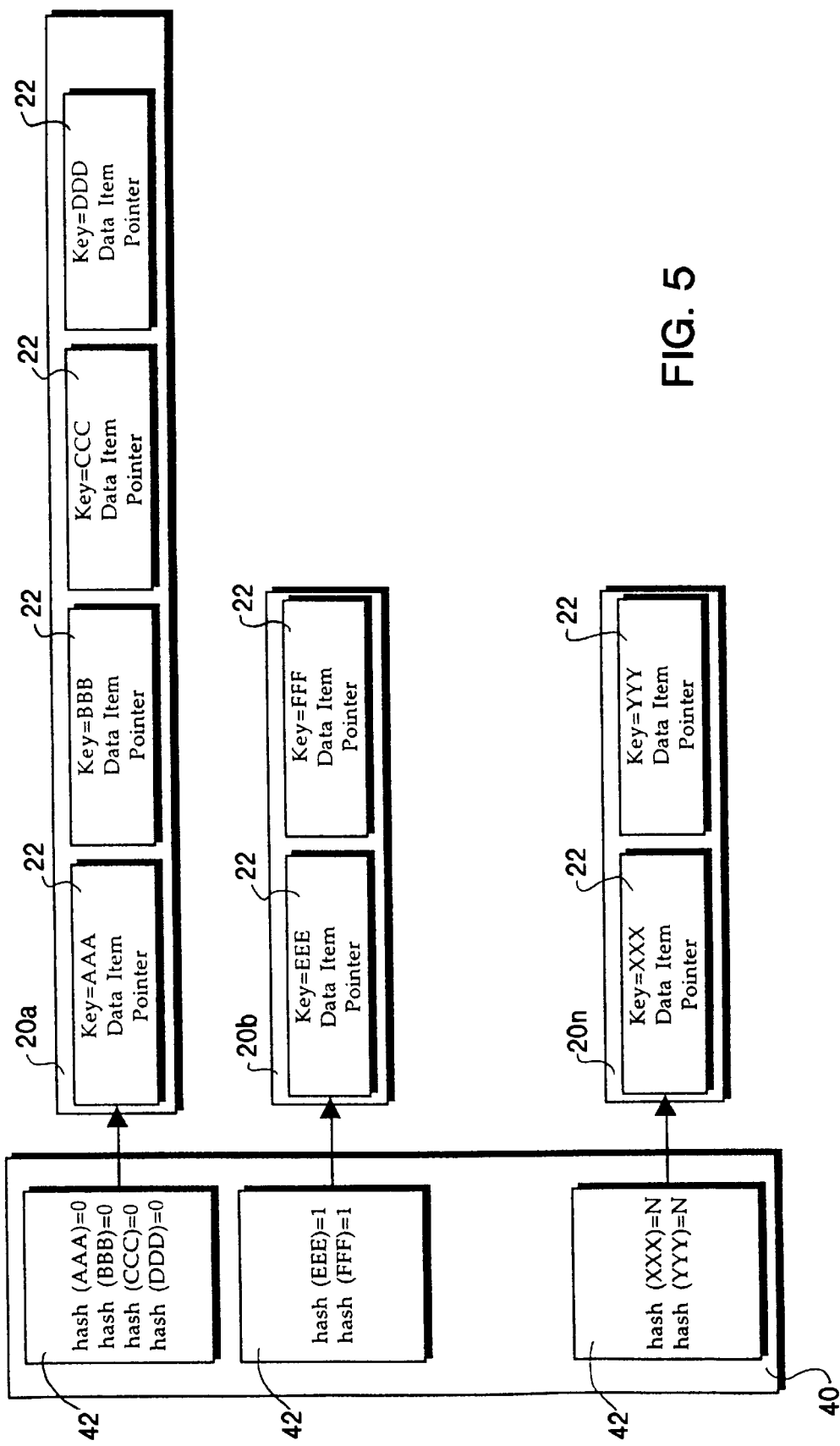
FIG. 5 is a block diagram illustrating the structure of a hash table.

FIG. 5 illustrates a hash table 40, including a number of entries, or buckets 42, each of which may reference a respective linked-list data structure 20. In a hash table data structure, data items that are objects (for example, employee records) are identified by a key. For example, the data item in the first element 22 of the linked-list data structure 20a is identified by the key "AAA". The hash table 40 computes an integer value derived from the key, which is termed the hash code. The hash code generated from the key "AAA" in the illustrated example is thus zero (0). The hash table 40 thus facilitates the generation of a compact array index. Data items having keys for which a common hash code is generated are viewed as being contained in the same bucket and may comprise a linked-list data structure 20 such as any one of those shown in FIG. 5. The present invention may be employed to manage a linked-list data structure 20 referenced by the hash table 40.

Figure 6:
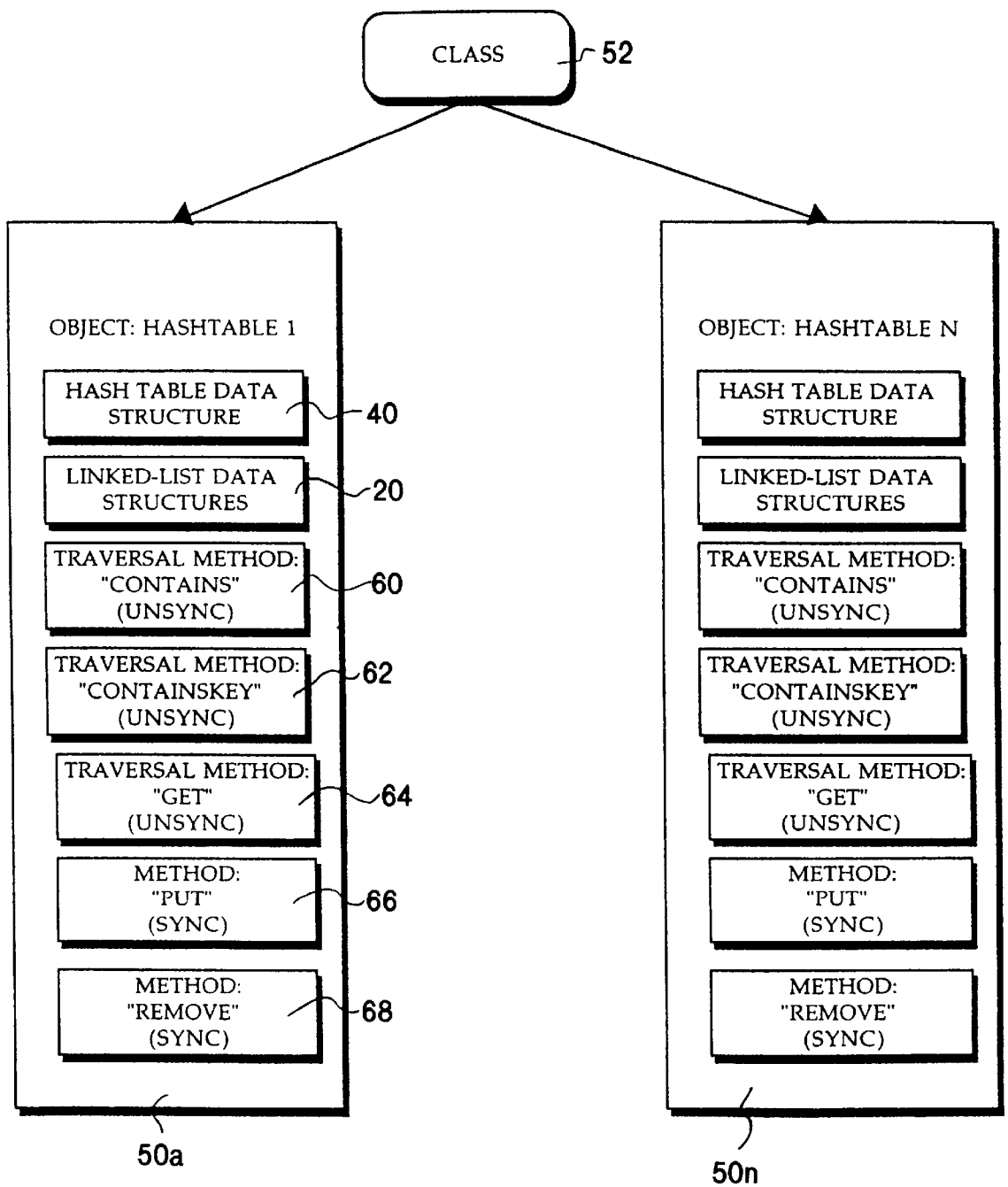
FIG. 6 is a block diagram illustrating a series of hash table objects, constructed according to one embodiment of the present invention.

FIG. 6 illustrates a series of objects 50, according to the present invention, which comprise objects of the class 52. Each of the objects 50 is shown to include a hash table data structure 40, which indexes a number of linked-list data structures 20. Each object further includes three unsynchronized traversal methods, namely the "CONTAINS" method 60, the "CONTAINS KEY" method 62, and the "GET" method 64. The "CONTAINS" method 60 tests if a key provided by a thread maps into specified value in the hash table data structure 40. The "CONTAINS KEY" method 62 tests if a specified object is a key in the hash table data structure 40, while the "GET" method 64 returns a data item to which a provided key is mapped in the hash table data structure 40. Each object further includes a synchronized "PUT" method 66 which is responsible for inserting an element 22 into a linked-list data structure 20, according to the methodology described above. Each object 50 also includes a synchronized "REMOVE" method 68, which is responsible for the removal of elements 22 from a linked-list data structure 20, according to the methodology described above. It will, of course, be appreciated that the objects 50 described above are merely exemplary, and the principles of the present invention may be applied to any number of objects of a variety of structures.

Figure 7:
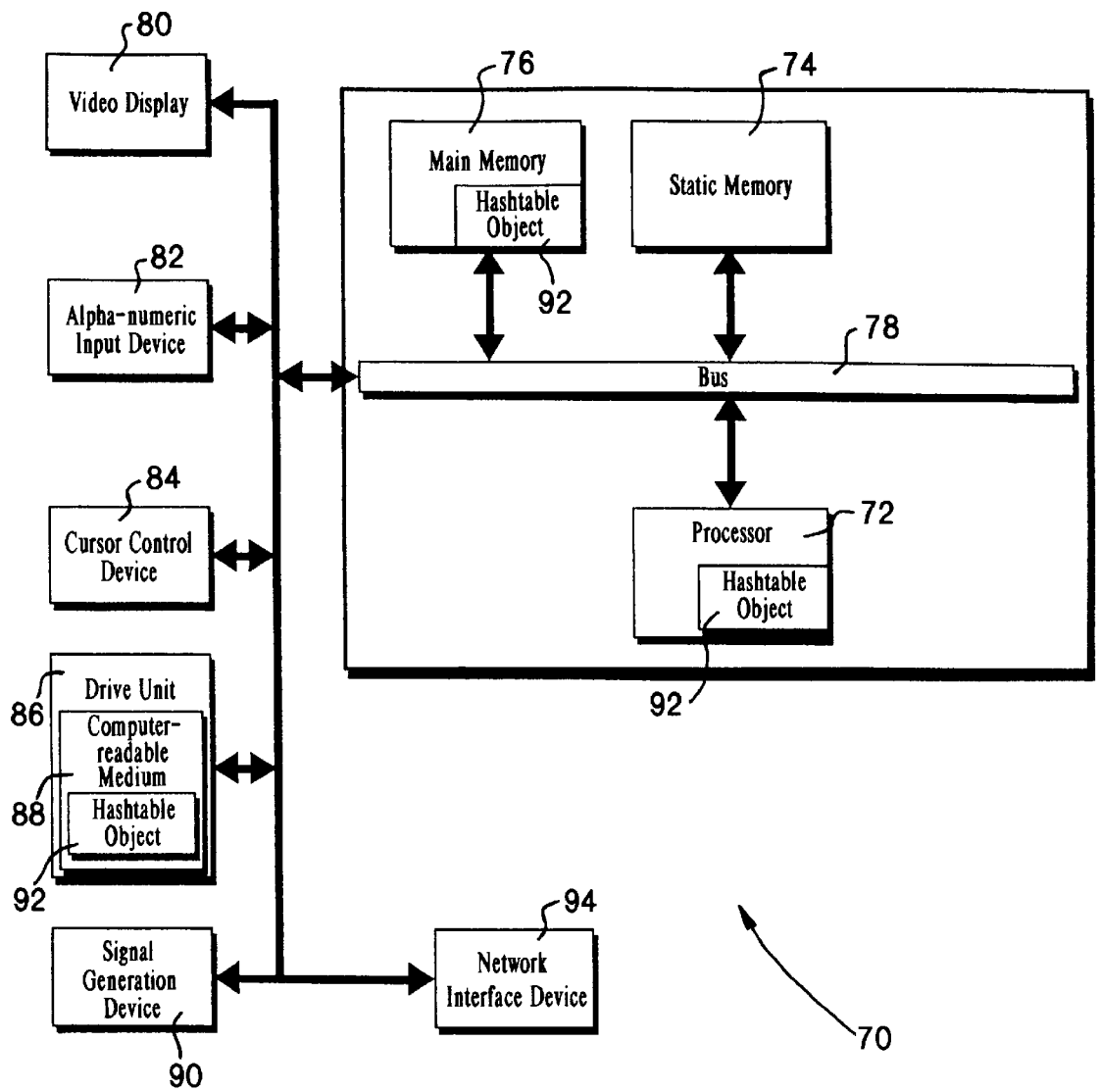
FIG. 7 is a block diagram illustrating a computer system including a computer-readable medium having stored thereon a sequence of instructions which, when executed by a processor of the computer system, cause the processor to perform a method of managing a linked-list data structure according to one embodiment of the present invention.

Turning now to FIG. 7, there is shown a computer system 70 including a processor 72, a static memory 74 and a main memory 76. The processor 72, and memories 74 and 76 communicate with each other, and with a number of peripheral devices, over a bus 78. The above mentioned peripheral devices include a video display 80 (such as a cathode ray tube (CTR) or a liquid-crystal display (LCD)), and an alpha-numeric input device 82 (such as a keyboard), a cursor control device 84 (such as a mouse), a drive unit 86 accommodating a computer-readable medium 88, a signal generation device 90 (such as a pair of audio speakers) and a network interface device 94. For the purposes of the present invention, the term "computer-readable medium" shall be taken to refer to a magnetic storage medium which may be accommodated within the drive unit 86, the main memory 76, the static memory 74, the processor 72 or any other medium from which data may be obtained for execution by the processor 72. A hash table object 92, which includes methods such as those described above, it is shown to be residing, either completely or in part, in the computer-readable medium 88, the main memory 76, or in the processor 72 itself. The hash table object 92 includes a sequence of instructions which, when executed by the processor 72, cause the processor 72 to perform at least the steps described above with reference to FIG. 4.

The network interface device 94 may be a modem, network adapter card, or any other device for coupling the computer system 70 to a computer network. The network access device 94 may be used to generate or receive a calTier wave having a computer data signal encoded therein, The computer data signal can be interpreted to generate program code that may be executed to implement the present invention.

Thus, a method of managing a linked-list data structure has been described. Although the present invention has been described with reference to specific exemplary embodiments, it will be evident that various modifications and changes may be made to these embodiments without departing from the broader spirit and scope of the invention. Accordingly, the specification and drawings are to be regarded in an illustrative rather than a restrictive sense.

What is claimed is:

1. A computer-implemented method of managing a linked-list data structure, the linked-list data structure including a first element, the first element comprising a first data portion and a first pointer portion, the method including:

modifying the linked-list data structure;

updating the first pointer portion of the first element to reflect the modification to the linked-list data structure, the step of updating comprising an atomic operation; and performing a first unsynchronized traversal of the linked-list data structure concurrently with the modification of the linked-list data structure, the first unsynchronized traversal comprising a mark and sweep garbage collection operation with respect to the linked-list data structure.

2. The computer-implemented method of claim 1 including performing concurrently a plurality of unsynchronized traversals of the linked-list data structure.

3. The computer-implemented method of claim 1 wherein the modification of the linked-list data structure comprises adding a second element into the linked-list data structure, the second element having a second data portion and a second pointer portion, and wherein the atomic operation includes modifying the first pointer portion of the first element to point to the second element.

4. The computer-implemented method of claim 3 wherein the atomic operation includes modifying the second pointer portion of the second element to point to a third element.

5. The computer-implemented method of claim 1 wherein the modification of the linked-list data structure comprises removing a second element from the linked-list data structure, and wherein the atomic operation includes modifying the first pointer portion of the first element to point to a third element instead of the second element.

6. The computer-implemented method of claim 1 wherein the modification of the linked-list data structure is a synchronous operation.

7. The computer-implemented method of claim 1 including performing a second unsynchronized traversal of the linked-list data structure concurrently with the modification of the linked-list data structure, the second unsynchronized traversal comprising a retrieval operation to retrieve a data portion of an element within the linked-list data structure.

8. In an object-oriented programming environment, a linked-list object comprising:

a linked-list data structure including a plurality of elements, each element having a respective data portion and a pointer portion;

a modifying method for modifying the linked-list data structure by the insertion or removal of a first element;

an updating method for updating the pointer portion of a second element to reflect the modification to the linked-list data structure utilizing an atomic modify operation; and a traversal method for performing an unsynchronized traversal of the linked-list data structure concurrently with the modification of the linked-list data structure by the modifying method, the traversal method comprising a mark and sweep garbage collection method for performing an unsynchronized mark and sweep garbage collection operation with respect to the linked-list data structure.

9. A machine-readable medium including a sequence of instructions which, when executed by a machine, cause the machine to perform the steps of:

modifying a linked-list data structure, the linked-list data structure including a first element, the first element having a first data portion and a first pointer portion, by the insertion or removal of a second element, the second element having a second data portion and a second pointer portion;

updating the first pointer portion of the first element to reflect the modification to the linked-list data structure, the step of updating comprising an atomic operation; and performing a first unsynchronized traversal of the linked-list data structure concurrently with the modification of the linked-list data structure, the first unsynchronized traversal comprising a mark and sweep garbage collection operation with respect to the linked-list data structure.

10. The machine-readable medium of claim 9 including the step of performing a plurality of unsynchronized traversals of the linked-list data structure concurrently with the modification of the linked-list data structure.

11. The machine-readable medium of claim 9 wherein the step of modifying comprises adding the second element into the linked-list data structure, and wherein the atomic operation includes modifying the first pointer portion of the first element to point to the second element.

12. The machine-readable medium of claim 11 wherein the atomic operation includes modifying the second pointer portion of the second element to point to a third element.

13. The machine-readable medium of claim 9 wherein the step of modifying comprises removing the second element from the linked-list data structure, and the step of updating comprises the step of atomically modifying the first pointer portion of the first element to point to a third element instead of the second element.

14. The machine-readable medium of claim 9 wherein the step of modifying the linked-list data structure is a synchronous operation.

15. A computer-implemented method of managing a linked-list data structure, the linked-list data structure including an element comprising a data portion and a pointer portion, the method comprising:

performing a first operation with respect to the linked-list data structure; and performing an unsynchronized traversal, comprising a mark and sweep garbage collection operation, of the linked-list data structure concurrently with the first operation, wherein the unsynchronized traversal includes performing a read of the pointer portion of the element, and the read is performed as an atomic operation.

16. The computer-implemented method of claim 15 wherein the first operation is a further unsynchronized traversal of the linked-list data structure.

17. The computer-implemented method of claim 15 wherein the first operation is a further synchronized modification of the linked-list data structure.

18. A machine-readable medium comprising instructions which, when executed by a machine, cause the machine to perform the steps of:

performing a first operation with respect to the linked-list data structure, the linked-list data structure including an element having a data portion and a pointer portion; and performing an unsynchronized traversal, comprising a mark and sweep garbage collection operation, of the linked-list data structure concurrently with the first operation;

wherein the unsynchronized traversal includes performing a read of the pointer portion of the element, and the read is performed as an atomic operation.

19. The machine-readable medium of claim 18 wherein the first operation is a unsynchronized traversal of the linked-list data structure.

20. The machine-readable medium of claim 18 wherein the first operation is a further synchronized modification of the linked-list data structure.

21. A computer data signal embodied in a carrier wave and representing a sequence of instructions which, when executed by a machine, cause the machine to perform the steps of:

modifying a linked-list data structure, the linked-list data structure including a first element having data and pointer portions, by the insertion or removal of a second element;

updating the pointer portion of a first element to reflect the modification to the linked-list data structure, the step of updating comprising an atomic operation; and performing a first unsynchronized traversal of the linked-list data structure concurrently with the modification of the linked-list data structure, the first unsynchronized traversal comprising a mark and sweep garbage collection operation with respect to the linked-list data structure.

22. A computer data signal embodied in a carrier wave and representing a sequence of instructions which, when executed by a machine, cause the machine to perform the steps of:

performing a first operation with respect to a linked-list data structures, the linked-list data structure including an element comprising a data portion and a pointer portion; and performing an unsynchronized traversal, comprising a mark and sweep garbage collection operation of, the linked-list data structure concurrently with the first operation;

wherein the unsynchronized traversal includes performing a read of the pointer portion of the element, and the read is performed as an atomic operation.

\* \* \* \* \*